(12) United States Patent
Esterhuizen et al.

(10) Patent No.: US 11,652,266 B2
(45) Date of Patent: May 16, 2023

(54) CALIBRATION SYSTEM FOR SATELLITE RADIO RECEIVERS OPERATION

(71) Applicant: SPIRE GLOBAL SUBSIDIARY, INC., San Francisco, CA (US)

(72) Inventors: Stephan Esterhuizen, San Francisco, CA (US); Oleguer Nogues-Correig, San Francisco, CA (US)

(73) Assignee: SPIRE GLOBAL SUBSIDIARY, INC., San Francisco, CA (US)

(*) Notice: Subject to any disclaimer, the term of this patent is extended or adjusted under 35 U.S.C. 154(b) by 391 days.

(21) Appl. No.: 16/863,130

(22) Filed: Apr. 30, 2020

(65) Prior Publication Data

US 2021/0341623 A1  Nov. 4, 2021

(51) Int. Cl.
| | |
|---|---|
| *H01P 5/18* | (2006.01) |
| *G01S 19/23* | (2010.01) |
| *H04B 7/185* | (2006.01) |
| *H04B 17/21* | (2015.01) |

(52) U.S. Cl.
CPC .............. *H01P 5/187* (2013.01); *G01S 19/23* (2013.01); *H01P 5/184* (2013.01); *H04B 7/18519* (2013.01); *H04B 17/21* (2015.01)

(58) Field of Classification Search
CPC .......... H01P 5/187; H01P 5/184; G01S 19/23; G01S 19/03; G01S 2013/9316; G01S 7/497; H04B 7/18519; H04B 17/21; H04B 17/0085; H04B 17/11; H04B 17/17; H04B 17/15; H04B 17/20; H04B 7/18506; H04B 1/40; H04B 17/309; H04B 17/318; H04B 1/3827; H04B 17/101; H04B 10/07955; H04B 2203/5491

See application file for complete search history.

(56) References Cited

U.S. PATENT DOCUMENTS

| | | | |
|---|---|---|---|
| 8,688,065 B2 | 4/2014 | Young et al. | |
| 9,103,912 B2* | 8/2015 | Yudanov | G01S 19/33 |
| 11,075,786 B1* | 7/2021 | Shattil | H04B 7/18506 |
| 11,092,693 B2* | 8/2021 | Ulmer | H04B 1/1027 |
| 2006/0256910 A1* | 11/2006 | Tai | H04B 1/71635 |
| | | | 375/135 |
| 2008/0291982 A1* | 11/2008 | Kirby | G01S 19/21 |
| | | | 375/148 |

(Continued)

OTHER PUBLICATIONS

Lambert Wanninger et al., "Group delay variations of GPS transmitting and receiving antennas", J. Geod (2017) vol. 91, pp. 1099-1116.

(Continued)

*Primary Examiner* — Lana N Le
(74) *Attorney, Agent, or Firm* — Steven M. Koehler; Westman, Champlin & Koehler, P.A.

(57) ABSTRACT

A radio calibration system includes an FPGA that generates a calibration signal by a pseudo noise generator and mixes the calibration signal with a carrier generated by a carrier generator. The FPGA injects the calibration signal into an analog electronic device which couples the calibration signal into a receiver channel. The receiver channel measures calibration signal power, group delay, and phase, and performs calibration based on these measurements. A reference clock synchronizes the pseudo noise generator, the carrier generator and the receiver channel.

15 Claims, 4 Drawing Sheets

(56) References Cited

U.S. PATENT DOCUMENTS

| | | | |
|---|---|---|---|
| 2009/0030605 A1* | 1/2009 | Breed | G01S 13/931 340/901 |
| 2016/0050034 A1* | 2/2016 | Pearse | H04B 17/21 455/67.14 |
| 2016/0204809 A1* | 7/2016 | Pratt | H04B 1/0475 375/219 |
| 2020/0091608 A1* | 3/2020 | Alpman | H04B 7/0482 |

OTHER PUBLICATIONS

Courtney Duncan et al., "An Interfrequency Bias Calibrator for TurboRogue GPS Receivers", Jet Propulsion Laboratory, California Institute of Technology, pp. 659-666.

* cited by examiner

CALIBRATION SYSTEM FOR SATELLITE RADIO RECEIVERS OPERATION

FIELD

The presently disclosed subject matter relates generally to a calibration system for a satellite radio system, more particularly, to systems and methods for calibrating received power, instrumental phase and group delay of the satellite radio system. The presently disclosed subject matter relates to systems and methods for generating a calibration signal, injecting the calibration signal into a receiver channel, and calibrating the satellite radio based on measurements of the receiver channel.

BACKGROUND

Existing radio calibration systems typically implement a non-black body calibrator and perform calibration by switching a receiver channel to the non-black body calibrator. With knowledge of the black body physical temperature, the excess noise power generated by the receiver channel is computed and used for calibration.

Some known calibration mechanism injects "fake satellites" into an antenna or RF input to help build precise ionosphere receivers for supporting Deep Space Network operations. See *An Interfrequency Bias Calibrator for TurboRogue GPS Receivers* by Duncan et al. The known mechanism implements a traditional transmitter (with L-band carrier and mixers) to generate the calibration signal at L-band. Further, U.S. Pat. No. 8,688,065 discusses measuring the absolute noise temperature of a receiver by periodically switching in noise from a noise diode.

U.S. Pat. No. 10,637,561, titled "Adaptable Space Radio", describes an adatable space radio for use in a satellite system within a constellation of satellites to adapt frequencies associated with satellite communication signals and associated channels. U.S. Patent Publication No. 20200025940A1, titled "Systems and Methods for De-Noising GNSS Signals," relates to removing noises in GNSS signal observation. The entire contents of U.S. Pat. No. 10,637,561 and U.S. Patent Publication No. 20200025940A1 are incorporated herein by reference.

There is a need for a less intrusive calibration system with an increased precision such as minimizing any interference between the receiver channel and any calibration signal. Further, there is a need for a simplified calibration system that does not require switching between the antenna and calibration source. There is also a need for a calibration system with high quality that presents small variations over temperature. There is a need for a calibration system with increased reliability and reduced overall system noise figure.

SUMMARY

One aspect of the disclosed technology relates to a radio calibration system. The radio calibration system includes a field-programmable gate array (FPGA). The FPGA includes a pseudo noise generator configured to generate a calibration signal, and a carrier generator configured to generate a carrier to be mixed with the calibration signal to generate a plurality of harmonics of the calibration signal. The calibration system also includes an analog electronic device. The analog electronic device includes a high pass filter, an attenuator, a coupler and a receiver channel. The high pass filter is configured to select one or more harmonics of the calibration signal from the plurality of harmonics at a select frequency. The attenuator is configured to attenuate a power level of the select harmonic of the calibration signal. The coupler is configured to inject the attenuated calibration signal into a receiver channel that receives a signal from an antenna input. The receiver channel is configured to measure power, group delay, and phase of the calibration signal. These measurements are used to perform absolute and relative channel calibration. The calibration system also includes a reference clock configured to synchronize the pseudo noise generator, the carrier generator and the receiver channel.

Another aspect of the disclosed technology relates to a coupler for coupling a calibration signal with a signal from an antenna input. The coupler includes a phase shifter configured to shift the calibration signal 0 and 90 degrees out of phase. The coupler also includes a printed circuit board. The printed circuit board includes a microstrip middle layer and a microstrip top layer. The microstrip middle layer is configured to receive the calibration signal 0 and 90 degrees out of phase. The microstrip top layer includes a microstrip trace configured to receive the signal from the antenna input. Mutual stray capacitance of the microstrip middle layer and the microstrip top layer creates a coupling between the calibration signal and the signal from the antenna input.

An additional aspect of the disclosed technology relates to a calibration method for calibrating a radio system. The method includes generating a calibration signal by a pseudo noise generator of an FPGA. The calibration signal is mixed with a carrier generated by a carrier generator of the FPGA to generate a plurality of harmonics of the calibration signal. A high pass filter selects a harmonic of the calibration signal of a select frequency from the plurality of harmonics. An attenuator attenuates the select harmonic of the calibration signal. The attenuated calibration signal is coupled with signals received from antenna inputs in receiver channels. One or more receiver channels measure calibration signal power. A ratio of power of the receiver channels is determined based on the measured calibration power. Calibration is performed based on the measured ratio of power.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
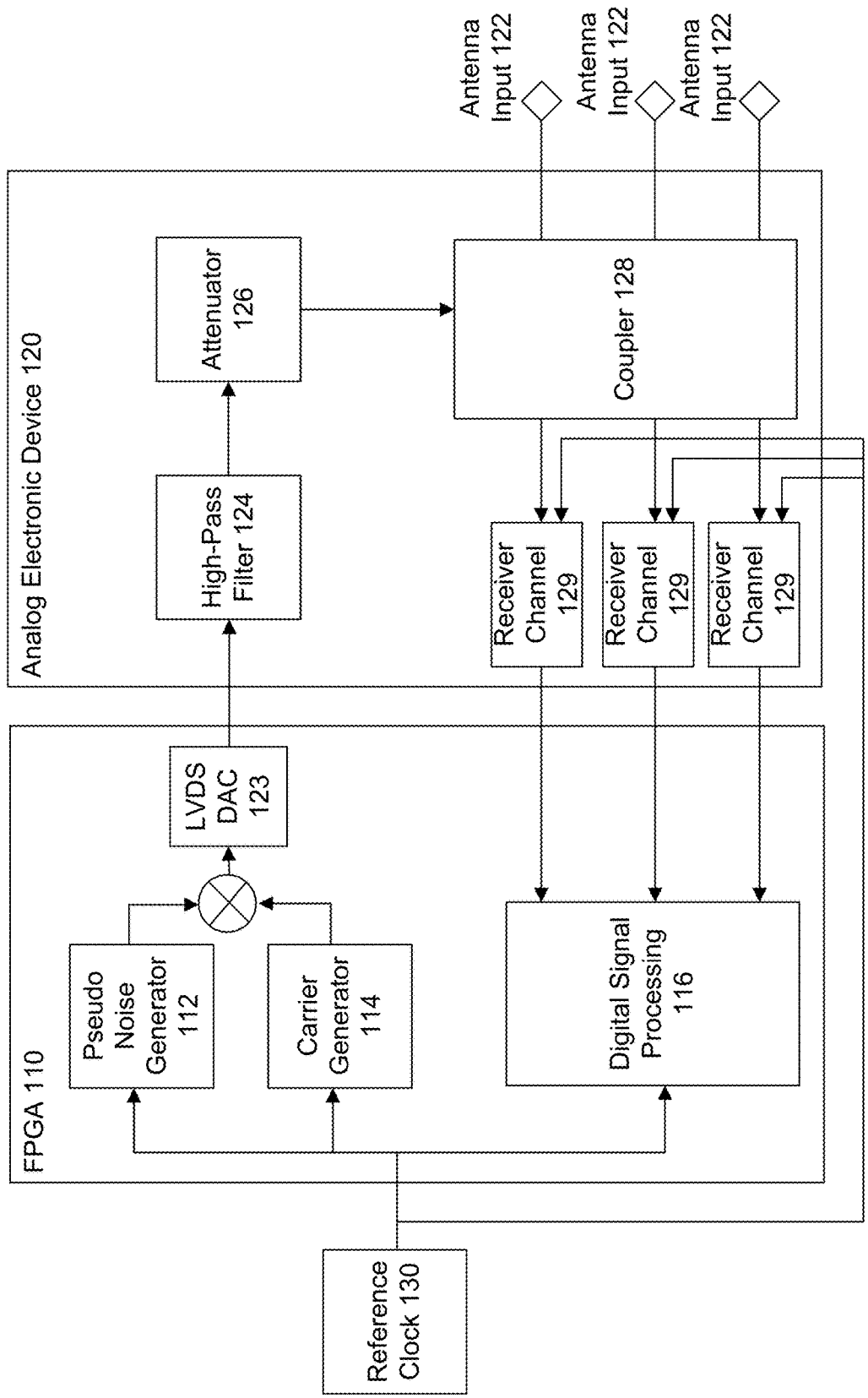
FIG. 1 is a block diagram of an example calibration system according to one aspect of the disclosed technology.

FIG. 1 illustrates a calibration system 100 for a radio system, which may calibrate two or more receiver channels 129 with high precision. Example radio system may include but not limited to Global Positioning System (GPS) and Global Navigation Satellite System (GNSS). The radio system may be part of a satellite, such as a low-earth orbit satellite. In one example, within a constellation of low-earth orbit satellites, each satellite may include a radio system for communication with other satellites and one or more ground stations. This calibration system 100 may allow for absolute and relative calibration of signal power, phase and group delay in the receiver channels 129.

The calibration system 100 may include a field-programmable gate array (FPGA) 110. The FPGA 100 may include a pseudo noise generator 112 which generates a calibration signal. In one example, the calibration signal may resemble a GPS signal or a GNSS signal. The FPGA 100 may also include a carrier generator 114, which generates a carrier that is mixed with the calibration signal to generate one or more harmonics of the calibration signal. The carrier may be a square wave carrier. In one example, the carrier frequency may be low, such as about 8 MHz, which produces a plurality of harmonics. One of the harmonics may approximate to the GPS L1 frequency, e.g., 1575.42 MHz. The FPGA 100 may inject the plurality of harmonics of the calibration signal into an analog front end or analog electronic device 120 where the calibration signal is coupled to signals received by antennas in the receiver channels. In one example, the analog front end 120 may be a GNSS analog front end.

A low-voltage differential signaling (LVDS) transmitter 123 may be used as a simple 1-bit DAC.

The analog electronic device 120 may inject the calibration signal at multiple frequencies on all antenna inputs 122 or receiver channels 129.

The analog electronic device 120 may include a high-pass filter 124. The high-pass filter 124 may select one or more harmonics that are close to a frequency of interest, e.g., a harmonic that is close to the GPS L1 frequency, while filtering or cutting other frequencies.

An attenuator 126 may further attenuate the calibration signal to a low power so as to avoid interference with receiver channels.

A coupling mechanism or coupler 128 may inject the calibration signal into one or more receiver channels 129 that receive signals from the antenna inputs 122. In one example, each receiver channel may get the same signal that looks like a GNSS signal. Since the calibration signal may have a much lower power as a result of attenuation performed by the attenuator 126, the calibration signal may not interfere with signals that are in that receiver channel.

The coupling mechanism 128 may split the calibration signal for any numbers of receiver channels or all receiver channels that receives signals from the antenna inputs 122. The coupling mechanism 128 may then couple the calibration signal on the receiver channels.

The analog electronic device 120 may include one or more receiver channels 129 in communication with each receiver channel. The receiver channel 129 may include a low noise amplifier (LNA). In one example, each receiver channel 129 may be a microwave receiver.

The receiver channel 129 may store information of the noise model used by the pseudo noise generator 112. The receiver channel 129 may implement well-established correlation techniques to correlate against the known noise model to measure properties of the calibration signal. Since the calibration signal has a very low power level, it only slightly increases the noise floor of the receiver channel 129. The receiver channel 129 may measure a signal power, such as a GNSS signal power, in each receiver channel. The receiver channel 129 may extract carrier phase and group delay (pseudo range) observables from the signal power of each receiver channel. The extracted carrier phase and the group delay may indicate instrumental delays. The receiver channel 129 may measure qualities that affect radio occultation and reflection measurements, including but not limited to, gain, power, phase, group-delay of the signal on each receiver channel input. The receiver channel may measure instrumental variations of these qualities, detect fluctuations in the channel power, to calibrate differences in receiver channel input gain, noise figure, and path length, among other possibilities.

The receiver channel 129 may store in advance predetermined information the ratio of power between the receiver channels at various temperatures when the receiver channels carry normal signals, without calibration signal injection. The ratio of power of the receiver channels may change as a function of temperature. Once the calibration signal is injected into the receiver channels, the receiver channel 129 may measure the temperature of the receiver channels. The receiver channel 129 may look up its storage to retrieve the predetermined ratio of power given the measured temperature. The receiver channel 129 may determine the power of each receiver channel as a function of the measured temperature. The receiver channel 129 may determine the power in each receiver channel, and determine the ratio of power among the receiver channels. Based on the determined ratio of power among the receiver channels, the receiver channel 129 may determine any fluctuation in the ratio of those powers. If there is a temperature change that is affecting those ratios, the digital signal processing 116 may perform adjustment. Based on the detected fluctuation, the digital signal processing 116 may relatively calibrate the signals that are being measured in each receiver channel.

In one example, a calibrated power ratio measurement may be calculated using the following formula.

$$PCAL12 = (SIG1/SIG2) * (CAL2/CRL1)$$

In the above formula, PCAL12 represents a calibrated SIG1/SIG2 power ratio. SIG1 represents a signal power as received from antenna by a first receiver channel. SIG2 represents a signal power as received from antenna by a second receiver channel. CAL1 represents a calibration power as received from a calibration subsystem by the first receiver channel. CAL2 represents a calibration power as received from the calibration subsystem by the second receiver channel.

Calibrated phase measurements may be calculated using the following formula. The same formula may apply for group delay, for example, by replacing PHASE with GROUPDELAY.

$$PHASE\_CAL\_N = SIGNAL\_PHASE\_N - CAL\_PHASE\_N$$

In the above formula, PHASE_CAL_N represents a calibrated carrier phase for a signal received by a receiver channel N. SIGNAL_PHASE_N represents an uncalibrated carrier phase for the signal received by the receiver channel N. CAL_PHASE_N represents phase of the calibration signal for the signal received by the receiver channel N.

The receiver channel 129 may measure the power of noises or the calibration signal. The receiver channel 129 may correlate the calibration signal against the signals received from the antenna inputs 122. The relative power of that noise may indicate how the receiver channels are calibrated with respect to each other. Therefore, the receiver channel 129 can determine the relative power of the signals coming into the antennas as they change over time.

The calibration system 100 may include a reference clock or oscillator 130. The reference clock 130 may be in communication with the pseudo noise generator 112, the carrier generation 114, the digital signal processing 116, and the receiver channel 129, so that they are all driven by the same clock 130. As a result, everything is coherent across the receiver channels. For instance, the same clock 130 controls the calibration signal that is injected into the receiver channels, and also controls the receiver channel 129 that measures the power.

In one embodiment, the calibration system 100 may not include any digital-to-analog converter.

In one embodiment, the calibration system 100 may perform a continuous calibration method. The calibration method disclosed herein may be continuous because the calibration signal is injected with 100% duty cycle, instead of periodically switched in existing technologies. The existing black body method periodically disconnects the antenna, switches to the black body, and then switches back to the antenna. Unlike existing technologies, the present technology does not switch the calibration source in-and-out of the receiver.

Figure 2:
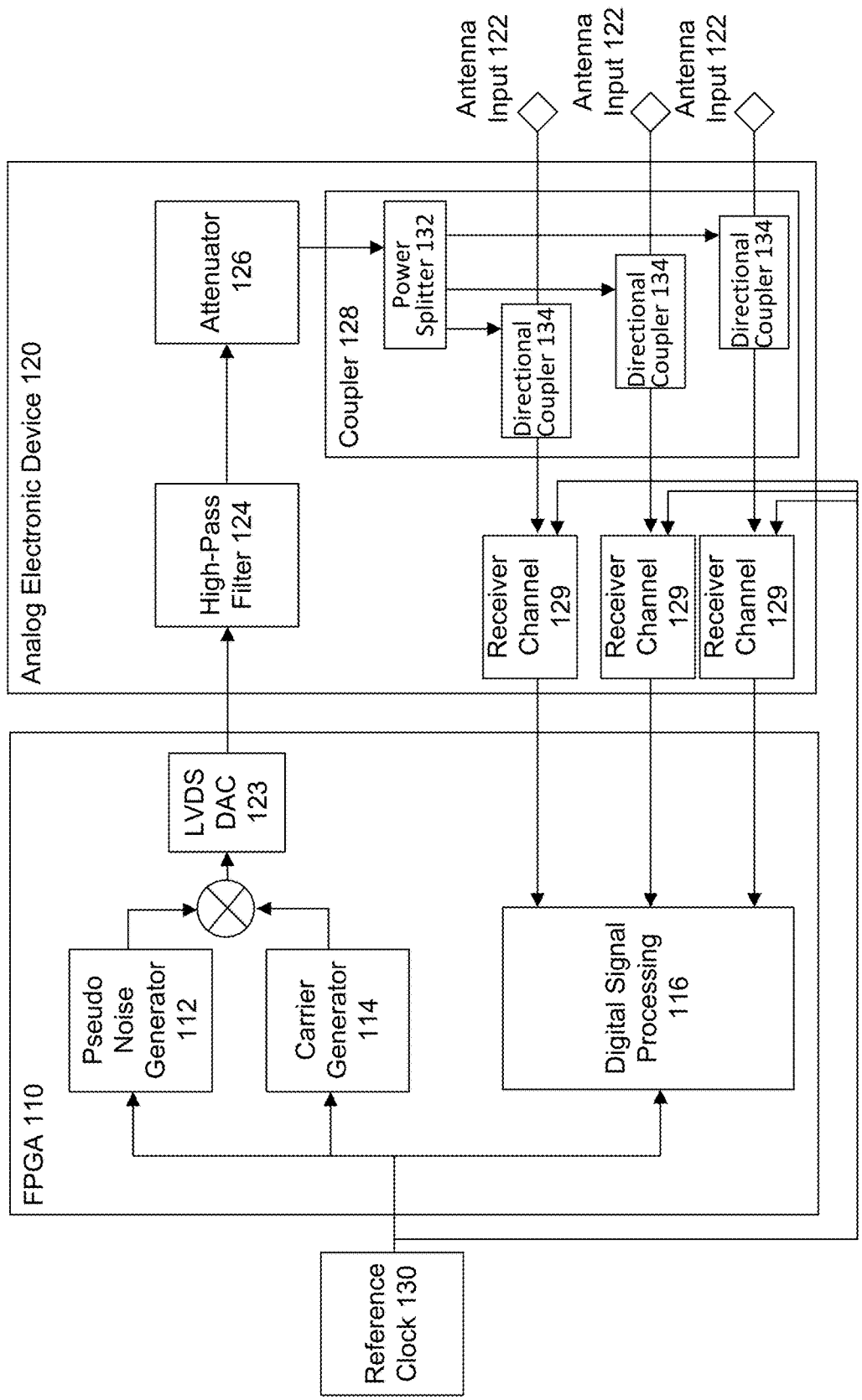
FIG. 2 is a block diagram of a first embodiment of the example calibration system according to one aspect of the disclosed technology.

The coupler 128 may be implemented according to different embodiments. In a first embodiment, as illustrated in FIG. 2, the coupler 128 may include discrete directional couplers 134, and one or more discrete power splitters 132. The power splitter 132 may be a microwave power dividers, or a 1:4 RF splitter.

Figure 3A:
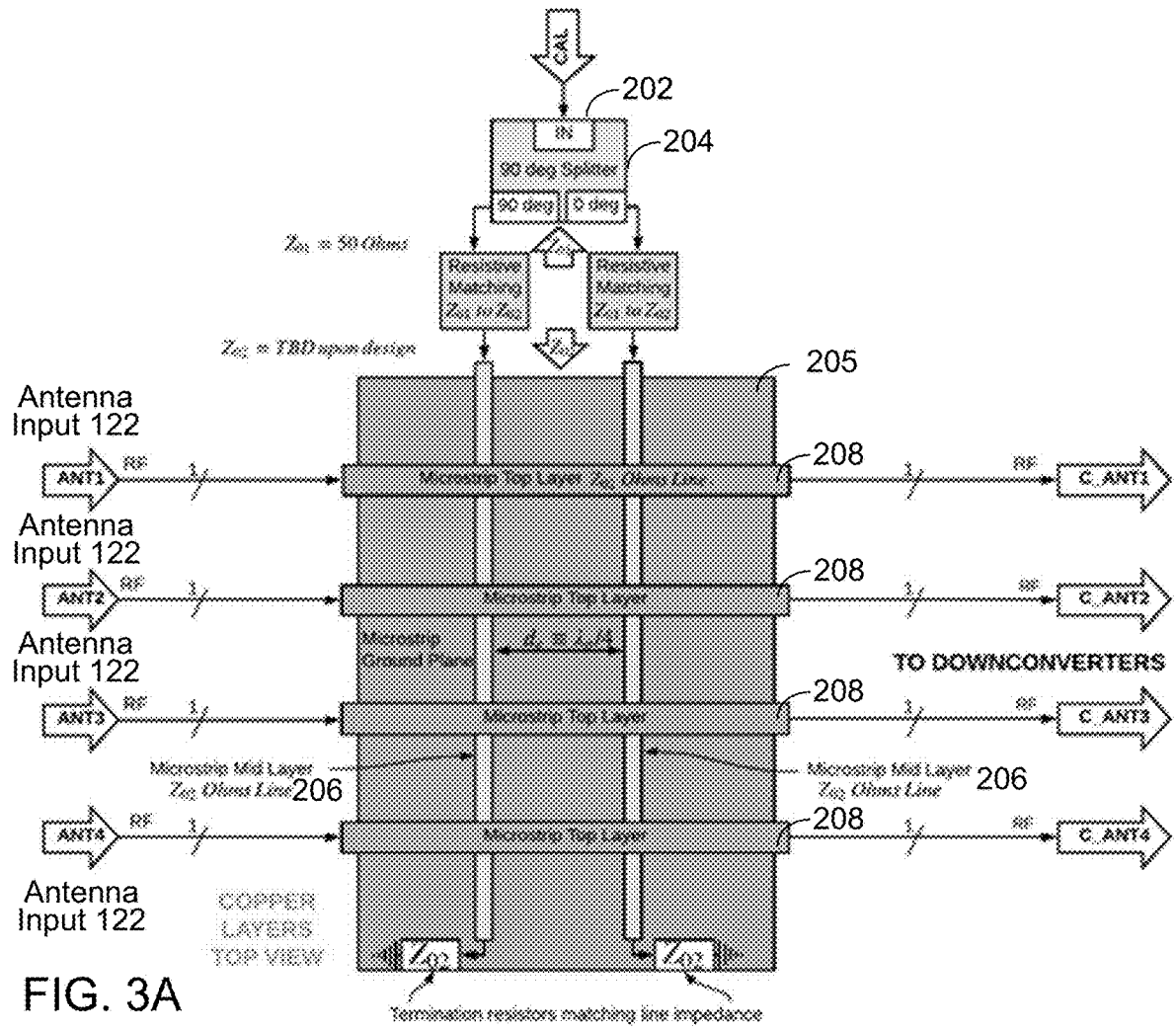
FIG. 3A is an example top view of a printed circuit board according to one aspect of the disclosed technology.
Figure 3B:
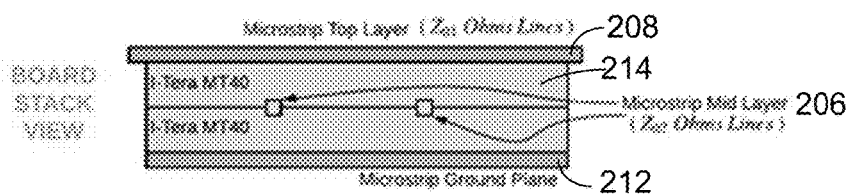
FIG. 3B is an example stack view of the printed circuit board of FIG. 3A according to one aspect of the disclosed technology.

In a second embodiment, as illustrated in FIGS. 3A-3B, instead of having discrete components, the coupler 128 may include a passive printed circuit board (PCB) 205. Signal splitting and directional coupler may be implemented using analog properties of the PCB 205. As illustrated in FIG. 3A, the PCB 205 may essentially serve as a 4-way directional coupler. The PCB 205 may include a top layer 208, traces or middle layer 206 and a ground plane 212. The middle layer 206 may be a microstrip middle layer. The top layer 208 may be a microstrip top layer. In one embodiment, the traces 206 may be copper traces. The top layer 208 may include a microstrip trace for receiving signals from the antenna input 122. The top layer 208 may lay over the top of the traces or the middle layer 206. The traces or middle layer 206 may be coupled to the top layer 208.

In one embodiment, both the traces or middle layer 206 and the top layer 208 may be in the form of microstrip lines that are orthogonally crossed and run on two different layer heights, but are referred to the same common ground plane 212. As a result, the traces or middle layer 206 and the top layer 208 create a controlled weak coupling. In one embodiment, at least one trace of the top layer 208 may cross at least one trace of the middle layer 206 at a distance of a quarter wavelength. In one embodiment, all traces of the top layer 208 may cross all traces of the middle layer 206 at a distance of a quarter wavelength. In one embodiment, each trace may be regarded as a microstrip trace or a microstrip line.

The PCB 205 may include dielectric material 214 between the traces 206. The dielectric material may be a high-quality dielectric substrate material, hence with associated low-loss and repeatable characteristics that are stable over temperature. The calibration signal from the FPGA 110 may be injected at the top "CAL" port 202.

A phase shifter 204 may shift the calibration signal in 90 degrees out of phase. After phase shifting, the calibration signals are fed into the traces or middle layer 206 of the PCB 205 0 and 90 degrees out of phase. The calibration signal may be coupled onto the microstrip trace in the top layer 208 purely due to coupling from the middle layer 206 to the top-layer 208. The coupling of the 0 and 90 degrees out of phase versions of the calibration signal occurs at two points separated a distance of a quarter wavelength on the antenna trace. Because of the relative phase combinations, the calibration signals that move towards the downconverters or receiver channels 129 add constructively, whereas that those that move toward the opposite direction add destrictively and cancel out.

This circuit architecture of the second embodiment leverages the mutual stray capacitance between two orthogonally crossed microstrip lines 206 and 208 that are running on two different layer heights, but which are referred to the same common ground plane 212, to create a controlled weak coupling.

The second embodiment has the following good properties. First, the coupling behavior is consistent on every PCB manufacturing batch, and presents small variations over temperature, thereby maximizing quality of the calibration.

Second, the second embodiment eliminates the need of the power splitter 132 and the discrete directional coupler 134, therefore reducing PCB components count. This, in turn, decreases the probability of manufacturing device soldering errors or device failure during PCB operation, hence increasing its reliability.

Third, the second embodiment minimizes the insertion losses before the first receiver channel to the least. This reduces the total system noise figure and thus increments the ratio of signal power to the noise power (SNR) of the observations.

Figure 4:
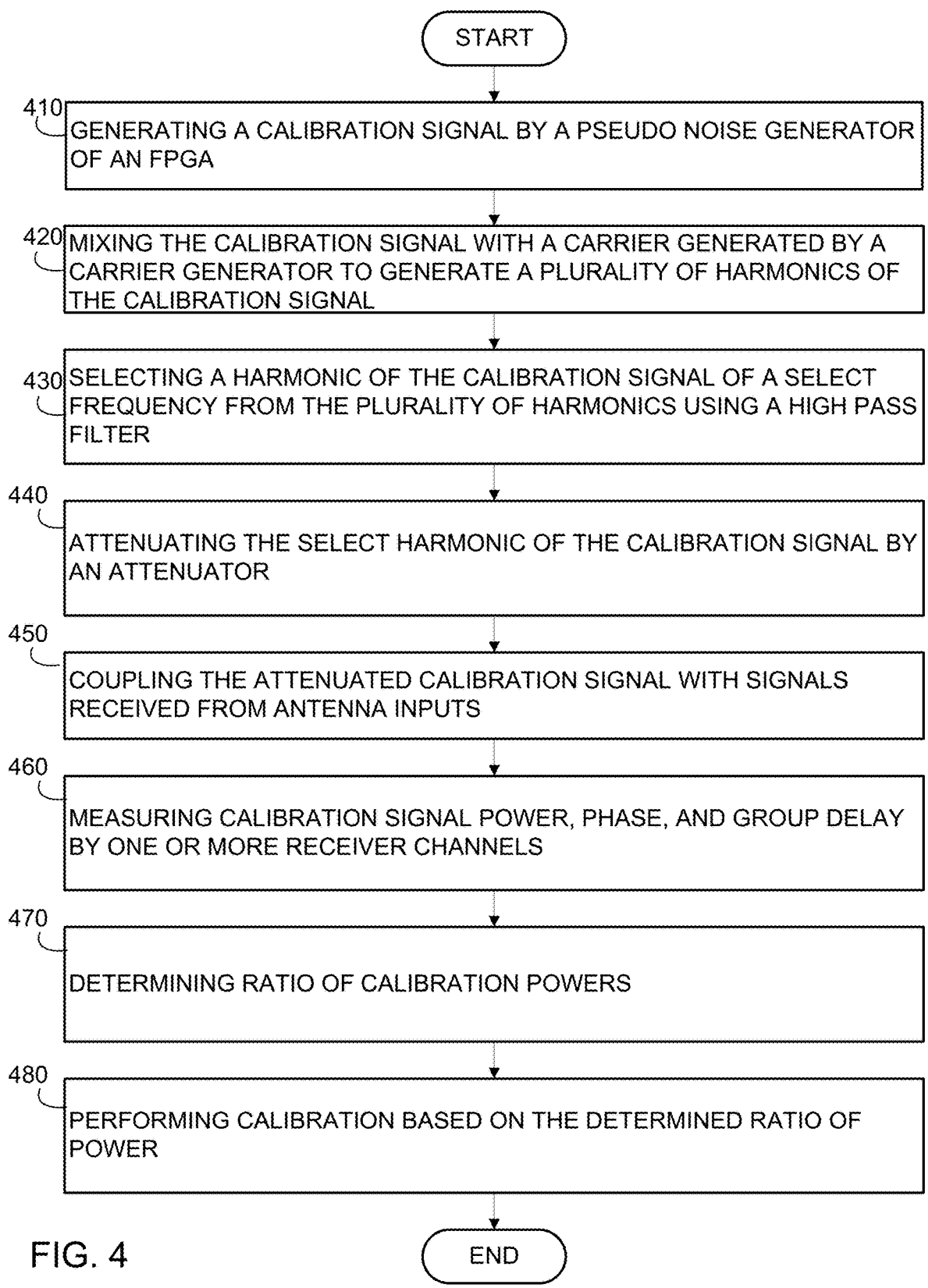
FIG. 4 is an example flow chart of a process performed by the calibration system according to one aspect of the disclosed technology.

FIG. 4 illustrates an example flow chart of a calibration process performed by the calibration system 100. At 410, the pseudo noise generator 112 of the FPGA 110 may generate a calibration signal. At 420, the carrier generator 114 may generate a carrier. The carrier may be mixed with the calibration signal to generate a plurality of harmonics of the calibration signal. At 430, the high-pass filter 124 may select a harmonic of the calibration signal of a select frequency from the plurality of harmonics. The select frequency may be the GPS L1 frequency. At 440, the attenuator 126 may attenuate the select harmonic of the calibration signal. At 450, the coupler 128 may couple the attenuated calibration signal with signals received from the antenna inputs 122. At 460, one or more receiver channels 129 may measure calibration signal power, phase, and group delay. At 470, one or more receiver channels 129 may determine a ratio of calibration powers. The receiver channels 129 may also determine group delay and phase corrections of the calibration signal. At 480, calibration is performed based on the determined ratio of power. Instrumental delay calibration may be performed based on the group delay and the phase corrections.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

Blocks of the block diagrams and flow diagrams support combinations of means for performing the specified functions, combinations of elements or steps for performing the specified functions and program instruction means for performing the specified functions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A radio calibration system, comprising:
a field-programmable gate array (FPGA) including:
a pseudo noise generator configured to generate a calibration signal, and
a carrier generator configured to generate a carrier to be mixed with the calibration signal to generate a plurality of harmonics of the calibration signal,
an analog electronic device including:
a high pass filter configured to select one or more harmonics of the calibration signal from the plurality of harmonics at a select frequency;
an attenuator configured to attenuate a power level of the select harmonic of the calibration signal;
a coupler configured to inject the attenuated calibration signal into a receiver channel that receives a signal from an antenna input; and
a receiver channel configured to:
measure power, group delay, and phase of the calibration signal,
determine a ratio of power, group delay and phase corrections of the calibration signal,
perform power calibration based on the determined ratio of power,
perform instrumental delay calibration based on the group delay and the phase corrections, and
a reference clock configured to synchronize the pseudo noise generator, the carrier generator and the receiver channel.

2. The radio calibration system of claim 1, wherein the select frequency is a GPS L1 frequency.

3. The radio calibration system of claim 1, wherein the carrier generator is a square wave generator.

4. The radio calibration system of claim 1, wherein the radio calibration system calibrates a GPS system and a GNSS system.

5. The radio calibration system of claim 1, wherein the coupler includes a power splitter configured to split the calibration signal into a plurality of receiver channels, and a plurality of discrete directional couplers that couple the calibration signals to one or more of the receiver channels.

6. The radio calibration system of claim 1, wherein the coupler includes a middle layer and a top layer of a printed circuit board, the middle layer receiving the calibration signal 0 and 90 degrees out of phase, and the top layer receiving the signal from the antenna input, the calibration signal being coupled to the signal from the antenna input due to physical arrangement of the middle layer and the top layer.

7. The radio calibration system of claim 1, wherein the coupler includes microstrip lines of a printed circuit board that are orthogonally crossed and run on two different layer heights, forming a coupling.

8. The radio calibration system of claim 1, wherein the receiver channel measures properties of the calibration signal against a known noise model used by the pseudo noise generator.

9. The radio calibration system of claim 1, wherein the receiver channel extracts from the calibration signal one or more of the following observables to determine instrumental delays: power, carrier phase, and group delay.

10. The radio calibration system of claim 1, wherein the receiver channel is configured to calibrate differences in input gain, noise figure, and path length.

11. The radio calibration system of claim 1, wherein the receiver channel uses the calibration signal to measure variations in gain, phase and group delay.

12. A calibration method for calibrating a radio system, comprising:
generating a calibration signal by a pseudo noise generator of an field-programmable gate array FPGA;
mixing the calibration signal with a carrier generated by a carrier generator of the FPGA to generate a plurality of harmonics of the calibration signal;

selecting a harmonic of the calibration signal of a select frequency from the plurality of harmonics using a high pass filter;

attenuating the select harmonic of the calibration signal by an attenuator;

coupling the attenuated calibration signal with signals received from antenna inputs in receiver channels;

measuring power by one or more receiver channels;

determining a ratio of power of the receiver channels based on the measured power of the calibration signal; and performing calibration based on the determined ratio of power.

13. The calibration method of claim 12, wherein the coupling of the attenuated calibration signal with the signals received from the antenna inputs is performed at least by one or more discrete directional coupler.

14. The calibration method of claim 12, wherein the coupling of the attenuated calibration signal with the signals received from the antenna inputs is performed at least by orthogonally crossed microstrips that run on different layer heights of a printed circuit board.

15. The calibration method of claim 12, further comprising:

measuring phase and group delay of the calibration signal;

determining phase corrections; and performing instrumental delay calibration based on the group delay and the phase corrections.

\* \* \* \* \*